(12) United States Patent
Alba et al.

(10) Patent No.: US 11,468,234 B2
(45) Date of Patent: Oct. 11, 2022

(54) IDENTIFYING LINGUISTIC REPLACEMENTS TO IMPROVE TEXTUAL MESSAGE EFFECTIVENESS

(71) Applicant: INTERNATIONAL BUSINESS MACHINES CORPORATION, Armonk, NY (US)

(72) Inventors: Alfredo Alba, Morgan Hill, CA (US); Clemens Drews, San Jose, CA (US); Daniel F. Gruhl, San Jose, CA (US); Christian B. Kau, Los Altos, CA (US); Neal R. Lewis, San Jose, CA (US); Pablo N. Mendes, San Francisco, CA (US); Meenakshi Nagarajan, San Jose, CA (US); Cartic Ramakrishnan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 430 days.

(21) Appl. No.: 15/632,467

(22) Filed: Jun. 26, 2017

(65) Prior Publication Data
US 2018/0373691 A1    Dec. 27, 2018

(51) Int. Cl.
*G06F 40/253* (2020.01)
*G06F 40/30* (2020.01)
(Continued)

(52) U.S. Cl.
CPC ......... *G06F 40/253* (2020.01); *G06F 40/166* (2020.01); *G06F 40/247* (2020.01); *G06F 40/279* (2020.01); *G06F 40/30* (2020.01)

(58) Field of Classification Search
CPC .... G06F 17/24; G06F 17/274; G06F 17/2765; G06F 40/253; G06F 40/30; G06F 40/166; G06F 40/279
(Continued)

(56) References Cited

U.S. PATENT DOCUMENTS 5,742,834 A * 4/1998 Kobayashi .......... G06F 17/2795
704/10
7,231,343 B1 * 6/2007 Treadgold ........... G06F 17/2785
704/9

(Continued)

FOREIGN PATENT DOCUMENTS

WO    WO2007064639 A2    6/2007

OTHER PUBLICATIONS

Shawn Knight; IBM unveils cognitive computing chips that mimic human brain; Aug. 18, 2011; TechSpot.com; pp. 1-20.*

(Continued)

*Primary Examiner* — Andrew R Dyer
(74) *Attorney, Agent, or Firm* — Conley Rose, P.C.

(57) ABSTRACT

At least some embodiments are directed to a computer-implemented method that comprises receiving original input text that includes a term, comparing a definition of the term to definitions of multiple candidate replacement terms to generate a set of candidate replacement terms, and substituting each of the candidate replacement terms in the set for the term in the original input text to produce a plurality of modified input texts. The method also comprises determining the grammatical accuracy of each of the plurality of modified input texts, comparing meanings of the modified input texts to a meaning of the original input text, and modifying the set of candidate replacement terms based on the determinations of grammatical accuracy and the comparisons of the meanings. The method still further comprises ranking the modified set of candidate replacement terms using one or more criteria, and displaying the ranking on a display.

18 Claims, 2 Drawing Sheets

(51) Int. Cl.
*G06F 40/166* (2020.01)
*G06F 40/247* (2020.01)
*G06F 40/279* (2020.01)

(58) Field of Classification Search
USPC .............................. 715/255, 256, 259, 260
See application file for complete search history.

(56) References Cited

U.S. PATENT DOCUMENTS

| | | | | |
|---|---|---|---|---|
| 7,503,000 | B1* | 3/2009 | Kreulen | G06F 17/30616 |
| | | | | 707/999.007 |
| 8,150,676 | B1* | 4/2012 | Kaeser | G06F 17/2881 |
| | | | | 704/1 |
| 8,290,772 | B1* | 10/2012 | Cohen | G06F 17/276 |
| | | | | 369/25.01 |
| 8,442,811 | B1* | 5/2013 | Broniek | G06F 17/24 |
| | | | | 379/387.01 |
| 8,612,203 | B2* | 12/2013 | Foster | G06F 17/2827 |
| | | | | 704/2 |
| 8,812,296 | B2* | 8/2014 | Selegey | G06F 17/2735 |
| | | | | 704/9 |
| 9,164,982 | B1* | 10/2015 | Kaeser | G06F 17/2881 |
| 9,519,871 | B1* | 12/2016 | Cardonha | G06F 17/274 |
| 9,672,476 | B1* | 6/2017 | Cardonha | G06F 16/93 |
| 10,261,995 | B1* | 4/2019 | Cerda | G06F 40/58 |
| 2002/0032564 | A1* | 3/2002 | Ehsani | G10L 15/193 |
| | | | | 704/E15.04 |
| 2004/0034630 | A1* | 2/2004 | Volcani | G06F 17/2795 |
| 2007/0073532 | A1* | 3/2007 | Brockett | G06F 40/58 |
| | | | | 704/9 |
| 2007/0168863 | A1* | 7/2007 | Blattner | G06F 3/011 |
| | | | | 715/706 |
| 2008/0046520 | A1* | 2/2008 | Jager | G06Q 10/107 |
| | | | | 709/206 |
| 2011/0035453 | A1* | 2/2011 | Koul | G06Q 10/107 |
| | | | | 709/206 |
| 2011/0184727 | A1 | 7/2011 | Connor | |
| 2012/0016661 | A1 | 1/2012 | Pinkas | |
| 2012/0002991 | A1 | 2/2012 | Medlock | |
| 2012/0089387 | A1 | 4/2012 | Gamon | |
| 2013/0159920 | A1* | 6/2013 | Scott | G06F 40/274 |
| | | | | 715/780 |
| 2014/0108924 | A1* | 4/2014 | Bhatt | G06F 40/157 |
| | | | | 715/271 |
| 2014/0229154 | A1 | 8/2014 | Leydon | |
| 2014/0278356 | A1 | 9/2014 | Anglin | |
| 2014/0372879 | A1* | 12/2014 | Kawakami | G06F 40/253 |
| | | | | 715/256 |
| 2015/0309986 | A1* | 10/2015 | Brav | G06F 17/277 |
| | | | | 707/739 |
| 2015/0310079 | A1* | 10/2015 | Brav | G06F 40/253 |
| | | | | 707/755 |
| 2016/0117313 | A1 | 4/2016 | Ajmera | |
| 2016/0246946 | A1* | 8/2016 | Haley | G06F 16/951 |
| 2016/0357731 | A1* | 12/2016 | Zorzin | G06F 17/2785 |
| 2017/0032781 | A1* | 2/2017 | Sharifi | G06F 40/30 |
| 2017/0040002 | A1* | 2/2017 | Basson | G09G 5/37 |
| 2018/0052842 | A1* | 2/2018 | Hewavitharana | G10L 15/26 |
| 2019/0361962 | A1* | 11/2019 | Laursen | G06F 21/6218 |

OTHER PUBLICATIONS

Shutova et al., "Statistical Metaphor Processing," Computational Linguistics, vol. 39, No. 2, May 31, 2012, 52 p.

* cited by examiner

IDENTIFYING LINGUISTIC REPLACEMENTS TO IMPROVE TEXTUAL MESSAGE EFFECTIVENESS

BACKGROUND

One characteristic of nearly all messages is that they are targeted to specific audiences. For example, commercials for heavy-duty pickup trucks may generally be targeted to American men, aged 18-55, who live in rural or semi-rural areas and who have a minimum household income of $35,000. Similarly, studies published in medical journals may be targeted to medical doctors and researchers who have the education and training required to understand the concepts described in the study. Authors seek to convey messages in a manner that is optimally effective for their intended audiences.

SUMMARY

At least some embodiments are directed to a computer-implemented method that comprises receiving original input text that includes a term, comparing a definition of the term to definitions of multiple candidate replacement terms to generate a set of candidate replacement terms, and substituting each of the candidate replacement terms in the set for the term in the original input text to produce a plurality of modified input texts. The method also comprises determining the grammatical accuracy of each of the plurality of modified input texts, comparing meanings of the modified input texts to a meaning of the original input text, and modifying the set of candidate replacement terms based on the determinations of grammatical accuracy and the comparisons of the meanings. The method still further comprises ranking the modified set of candidate replacement terms using one or more criteria, and displaying the ranking on a display.

At least some embodiments are directed to a computer program product for identifying linguistic replacements to improve textual message effectiveness. The computer program product comprises a computer-readable storage medium having program instructions embodied therewith, which, when executed by a processor, cause the processor to receive original input text that includes a term. The instructions also cause the processor to access a dynamically modifiable corpus of candidate replacement terms to collect a set of candidate replacement terms and to modify the set of candidate replacement terms based on an analysis of definitional similarity between the term and each of the set of candidate replacement terms, of the grammatical accuracy of modified input texts generated by replacing the term with each of the candidate replacement terms in the set, and of the meanings of each of the modified input texts. The instructions further cause the processor to rank the modified set of candidate replacement terms based on multiple weighted criteria, and to display the ranking on a display.

At least some embodiments are directed to system comprising an input device configured to receive original input text that includes a term, an output device configured to display images, and storage comprising executable code. The system also comprises a network interface configured to access a dynamically changing corpus of information and a processor coupled to the input device, the output device, the storage, and the network interface. Execution of the executable code causes the processor to collect from the corpus a set of candidate replacement terms based on comparisons of definitions of the candidate replacement terms and a definition of the term in the original input text. The processor also generates a first score for each of the candidate replacement terms in the set based on the comparisons of definitions. The processor analyzes the grammatical accuracy of modified input texts that replace the term with the candidate replacement terms in the set. The processor further determines the meaning of each of the modified input texts and generates a second score for each of the candidate replacement terms in the set based on the analyses and the determinations. The processor also assesses the popularity of each of the modified input texts using the corpus, generates a third score for each of the candidate replacement terms in the set based on the assessments, and determines a final score for each of the candidate replacement terms in the set based on a weighted calculation using the first, second, and third scores of each such candidate replacement term. The processor still further ranks the candidate replacement terms in the set based on the final scores and displays the ranking on the output device.

DETAILED DESCRIPTION

Figure 1:
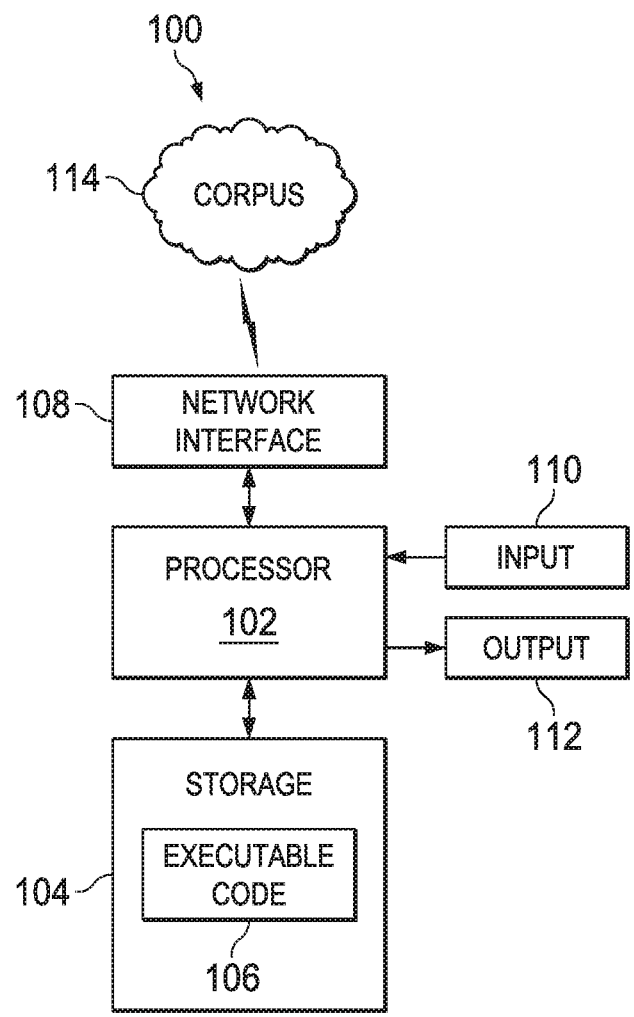
FIG. 1 is a block diagram of an illustrative computer configured to propose linguistic replacements.

At least some of the embodiments disclosed herein are directed to a computer system for identifying linguistic replacements to improve the effectiveness with which messages are conveyed to target audiences. In some embodiments, the computer system receives original input text and identifies a term in the original input text for replacement. The computer system may access a corpus of information, such as a large collection of social media content (e.g., a large repository of TWITTER® Tweets), to identify a set of candidate replacement terms that have definitions similar to the definition of the term that is to be replaced. In addition, the computer system may insert each of the candidate replacement terms of the set into the original input text to generate multiple modified input texts. The computer system may analyze the grammatical accuracy of each of the modified input texts, and it may also compare the meaning of each of the modified input texts to the meaning of the original input text to determine whether the substitutions using the candidate replacement terms affected grammatical accuracy or altered the meaning of the original input text. The computer system may modify the set of candidate replacement terms based on the analyses of grammar and meaning. The computer system may also rank the candidate replacement terms in the modified set based on the degree to which each candidate replacement term complies with one or more criteria. The criteria may be weighted based on user preference. The computer system may then display the ranking on a display. In response to a user selection, the computer system may substitute the selected candidate replacement term into the original input text in lieu of the term to be replaced.

In some embodiments, a computer system receives original input text and identifies a term in the original input text for replacement. The computer system may access the aforementioned corpus of information to identify a set of candidate replacement terms that have definitions similar to the definition of the term that is to be replaced. The computer system may generate a first score for each of the candidate replacement terms of the set based on the degree of similarity between the definition of that term and the definition of the term to be replaced. For example, a candidate replacement term whose definition more closely approximates the definition of the term to be replaced may be assigned a higher score than another candidate replacement term whose definition less closely approximates the definition of the term to be replaced. In addition, the computer system may insert each of the candidate replacement terms of the set into the original input text to generate multiple modified input texts. The computer system may analyze the grammatical accuracy of each of the modified input texts, and it may also compare the meaning of each of the modified input texts to the meaning of the original input text to determine whether the substitutions using the candidate replacement terms affected grammatical accuracy or altered the meaning of the original input text. The computer system may assign a second score to each of the candidate replacement terms, with a higher score indicating higher grammatical accuracy and a meaning that more closely approximates the meaning of the original input text; a lower score indicating lower grammatical accuracy and a meaning that less closely approximates the meaning of the original input text; and a mid-range score indicating medium grammatical accuracy and medium approximation of meaning, a high grammatical accuracy with a less close approximation of meaning, or a low grammatical accuracy and a close approximation of meaning. The computer system may assess the degree to which each of the candidate replacement terms satisfies one or more criteria (e.g., weighted criteria), and the system may assign a third score to each of the candidate replacement terms based on such assessments. The computer system may then calculate a final score for each of the candidate replacement terms based on the first, second, and third scores, where the first, second, and third scores may be weighted. The computer system may rank the candidate replacement terms based on the final scores and may display the ranking on a display. In response to a user selection, the computer system may substitute the selected candidate replacement term into the original input text in lieu of the term to be replaced.

FIG. 1 is a block diagram of an illustrative computer system 100 configured to propose linguistic replacements. The computer system 100 may comprise a processor 102; storage 104 (e.g., random access memory (RAM), read-only memory (ROM)) storing executable code 106; a network interface 108 configured to provide communications between the processor 102 and a corpus 114; an input device(s) 110; and an output device(s) 112. In some embodiments, the computer system 100 is a cognitive computing system, such as the WATSON® cognitive computing system by IBM®. One or more of the components of the computer system 100 may be distributed in nature—for instance, the processor 102 may be a distributed processor; the corpus 114 may comprise multiple, distributed repositories of information; and the input and output devices 110, 112 may comprise multiple input devices and/or multiple output devices. All such distributed components may be co-located or located in separate facilities. The corpus 114 may include various types of information, including dictionaries, thesauri; social media content (e.g., TWITTER® Tweets; FACEBOOK® walls, comments, and news feeds; LINKEDIN® accounts; INSTAGRAM® comments; SNAPCHAT® comments); text messages; e-mails; and any and all other examples of language use that may be categorized based on demographics of the authors and/or target audiences. The corpus 114 may contain other types of information as well.

The corpus 114 may be organized based on the demographics of people who generated the content of the corpus 114, since different demographic groups may use different linguistic norms, slang, punctuation, and the like. For example, Tweets authored by male political leaders in the age range of 35-44 may be categorized into a first portion of the corpus 114 that includes content authored by men; a second portion of the corpus 114 that includes content authored by political leaders; a third portion of the corpus 114 that includes content authored by persons ages 35-44; and one or more other portions of the corpus 114 that comprise the target audience(s) of such Tweets. In this sense, each such portion of the corpus 114 is based on the linguistic norms of a particular demographic group. Other corpus classification techniques are contemplated and fall within the scope of the disclosure. In some embodiments, the corpus 114 is in a common language, although the scope of disclosure is not limited as such. In some embodiments, each portion of the corpus 114 is in a common language, although the scope of disclosure is not limited as such.

In at least some embodiments, the corpus 114 is dynamically modifiable, meaning that the content of the corpus 114 may be regularly, irregularly, or continuously modified to include new content and/or to remove outdated content. Such a dynamically modifiable corpus 114 may evolve over time to include new linguistic trends as they emerge in the popular parlance. For example, a previously non-existent term that is conceived of and gradually popularized by musical artists in the hip-hop community may enter the corpus 114 upon conception and appear with increasing frequency in the corpus 114 as the term is used more frequently in social media. As the newly-coined term is used in content authored by various demographic groups, the term—possibly along with the context in which it is used—may be added to the portions of the corpus that correspond to such demographic groups. The term and its context also may be added to portions of the corpus that correspond to the target audience(s) of such content. Other distributions of content within the corpus 114, as well as other corpus architectures, are contemplated and included within the scope of this disclosure.

Figure 2:
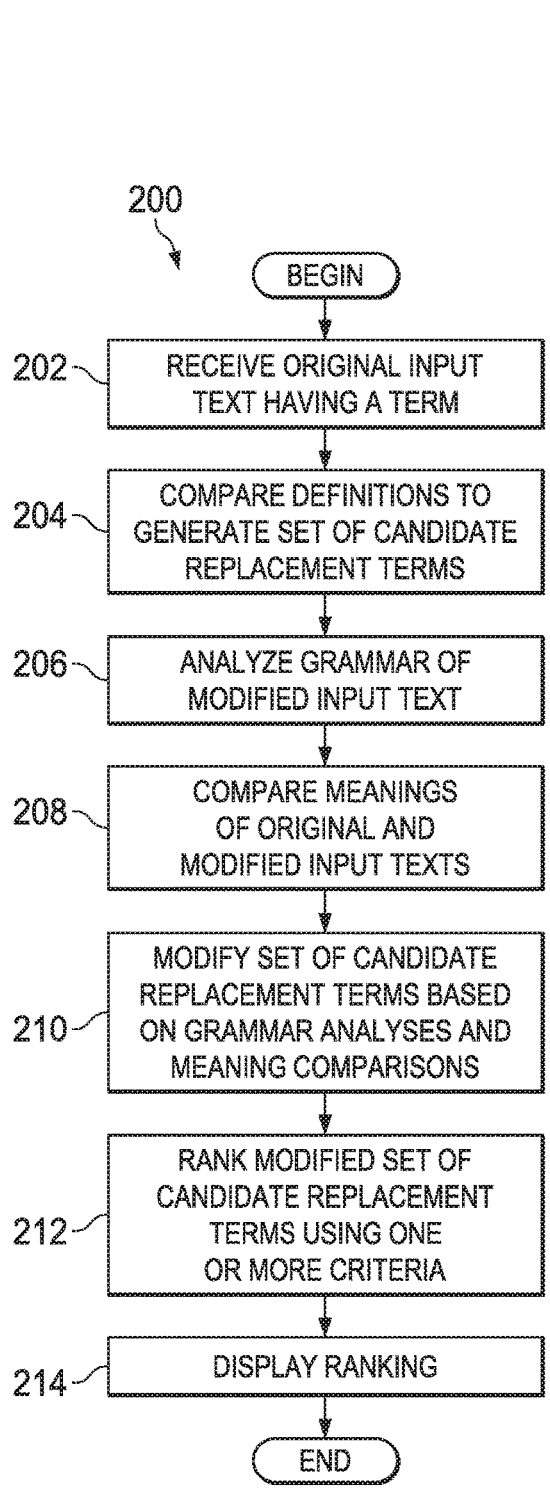
FIG. 2 is a flow diagram of an illustrative process used to propose linguistic replacements.

FIG. 2 is a flow diagram of an illustrative method 200 used to propose linguistic replacements. The steps of the method 200 may be performed by, e.g., the computer system 100 of FIG. 1. More specifically, the steps of the method 200 may be performed by the processor 102 upon executing the executable code 106 and accessing input provided via the input device 110 and the information stored in the corpus 114. Outputs of the method 200 may be provided via the output device 112. The method 200 begins by receiving original input text that includes one or more terms (step 202). A "term" may comprise a word or a phrase. Thus, for example, original input text may comprise a phrase, a sentence, a paragraph, or an entire document, although the scope of disclosure is not limited as such. The processor 102 may receive the original input text via the input device 110, or the processor 102 may receive the original input text via another source (e.g., via a network interface 108 connection to another computer on the Internet).

The method 200 then comprises comparing the definition of a term in the original input text that is to be replaced with the definitions of one or more candidate replacement terms (step 204). The term to be replaced in the original input text may be identified by the processor 102, a user of the computer system 100, or some other entity as may be suitable. For instance, the processor 102 may determine that, based on the target audience of the original input text as provided by a user of the computer system 100 or as automatically determined by the processor 102, and further based on language stored in the corpus 114 (e.g., similar messages as the original input text that were highly popular on social media), the original input text contains one or more terms that should be replaced to generate a more effective message. The processor 102 may identify candidate replacement terms by accessing all or multiple parts of the corpus 114 via the network interface 108 and locating terms that have definitions similar to that of the term to be replaced. Alternatively, the processor 102 may identify candidate replacement terms by accessing just one portion of the corpus 114. For example, in some embodiments, the processor 102 may be provided with information regarding the target audience of the original input text, and the processor 102 may access one or more portions of the corpus 114 having demographics that align with the target audience of the original input text.

The processor 102 may determine definitions of original input text terms and candidate replacement terms based on, e.g., one or more dictionaries available via the network interface 108 or stored on storage 104. Other techniques for comparing definitions are contemplated. The processor 102 may determine whether a definition of a candidate replacement term is sufficiently close to a definition of an original input text term using the corpus 114—e.g., by determining how frequently the candidate replacement term is used as a synonym for the original input text term in any portion of the corpus 114 or in portions of the corpus 114 that are demographically aligned with the target audience of the original input text (e.g., by age, sex, race, income, geographic location, country of origin, sexual orientation, or any and all other demographic classifications). Definitional similarity between terms may be assessed and quantified using various techniques. In some embodiments, terms may be expressed as vectors in multi-dimensional space. Such a vector may be a reduced dimensionality vector. In such a space, term similarity may be determined by calculating the cosine difference between the two vectors after they have been normalized. Other techniques may be used. Based on such comparisons of definitions between the term to be replaced in the original input text and one or more candidate replacement terms in the corpus 114, the processor 102 may assemble a set of candidate replacement terms. The set may contain any suitable number of candidate replacement terms as desired.

The method 200 then comprises analyzing the grammar of modified input texts (step 206). The processor 102 generates one or more modified input texts by substituting each of the candidate replacement terms into the original input text in lieu of the term to be replaced, thus generating a new, modified input text for each candidate replacement term. To analyze grammar, the processor 102 may review each of the modified input texts using available grammar tools, such as that used in MICROSOFT® WORD® and other word-processing applications. In this step, the processor 102 identifies grammatical errors and thus determines the grammatical accuracy of each of the modified input texts. In some embodiments, the processor 102 may modify, or may suggest modification of, other parts of the modified input texts to accommodate a candidate replacement term that would otherwise be grammatically unsuitable. For example, if the combination of the word "the" and a candidate replacement term render a modified input text grammatically inaccurate, the processor 102 may in some embodiments remove the word "the" (or suggest such removal) so that the modified input text is rendered grammatically accurate. In some embodiments, grammatical accuracy may be assessed and quantified using a smoothed n-gram probability of a particular candidate replacement term being in a particular position within the modified input text in question. The scope of disclosure, however, is not limited to these techniques. For instance, in some embodiments, the processor 102 may assess the grammatical accuracy of a modified input text based on the linguistic norms of a particular demographic group by comparing the modified input text to a corpus of the target demographic of the original input text to determine a number of matches. If the number of matches meets or exceeds a threshold, the grammar used in a particular modified input text may be appropriate for the linguistic norms of the corresponding demographic group.

The method 200 next includes comparing the meaning of the original input text to the meanings of each of the modified input texts (step 208). In at least some embodiments, the processor 102 may perform such a comparison using a thesaurus (e.g., WORDNET®) or by querying a human.

The method 200 further comprises modifying the set of candidate replacement terms based on the grammar analyses and comparisons of meaning described above (step 210). The processor 102 may perform part of this step by setting or receiving a threshold against which to compare the grammatical accuracy of each of the modified input texts. If a particular modified input text has grammatical accuracy that falls below a particular threshold (or if it has grammatical error that meets or exceeds a particular threshold), the processor 102 may remove the corresponding candidate replacement term from the set of candidate replacement terms. Similarly, the processor 102 may perform part of this step by setting or receiving a threshold against which to compare similarity in meaning between the original input text and each of the modified input texts. If this analysis for a particular modified input text indicates a similarity in meaning that falls below a particular threshold (or if it has dissimilarity in meaning that meets or exceeds a particular threshold), the processor 102 may remove the corresponding candidate replacement term from the set of candidate replacement terms. Performance of the step 210 results in a modified set of candidate replacement terms.

The method 200 may include ranking the candidate replacement terms in the modified set of candidate replacement terms using one or more criteria (step 212). The processor 102 may receive such criteria from a user of the computer system 100, from the corpus 114 (e.g., from portions of the corpus 114 that correspond to the target audience of the original input text), from another computer communicably coupled to the processor 102 via the network interface 108, from the storage 104, or from any other suitable source. Any suitable criteria may be used; however, examples of such criteria include, without limitation: the frequency of use of a particular term among a target audience; simplicity or complexity of a term (e.g., the number of letters or words in the term); erudition associated with the term (e.g., whether the term is used most frequently or almost exclusively in formal writing); affect associated with the term (e.g., based on dictionary definitions or how frequently the term is used in social media content of an emotional nature); historical success of the term with the target audience; and technical complexity of the term (e.g., whether the term is found most frequently or almost exclusively in technical or scientific papers).

In assessing these or other criteria with respect to each candidate replacement term, the processor 102 may quantify the degree to which each candidate replacement term meets each criterion and may assign numerical values to each candidate replacement term accordingly. In at least some embodiments, the criteria may be weighted. For example, a user may assign greater weight to the erudition of the term in question and lesser weight to the affect associated with the term. Accordingly, when ranking the candidate replacement terms in the modified set, the processor 102 would give greater weight to candidate replacement terms with greater erudition and less affect and lesser weight to candidate replacement terms with less erudition and greater affect. The processor 102 combines the weighted numerical values for each candidate replacement term in the modified set and ranks the modified set of candidate replacement terms accordingly. The processor 102 may then display the rankings to a user (step 214). The method 200 may be modified as desired, including by adding, deleting, modifying, or rearranging one or more steps.

Figure 3:
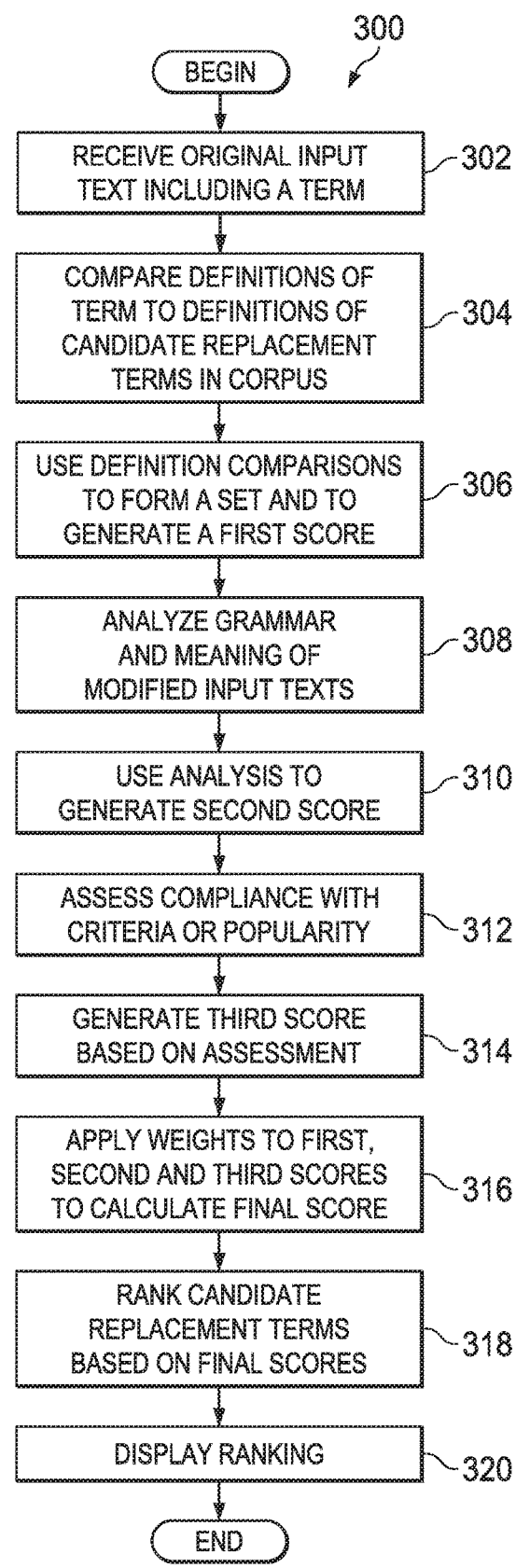
FIG. 3 is a flow diagram of another illustrative process used to propose linguistic replacements.

In some embodiments, the processor 102 may take an approach that is different from that described above with respect to the method 200 in FIG. 2. Specifically, in such embodiments, the processor 102 may quantify each of its analyses of each candidate replacement term and then calculate a weighted final score for each candidate replacement term, with a final ranking based on such a weighted final score. FIG. 3 depicts such a method 300. The steps of the method 300 may be performed by, e.g., the computer system 100 of FIG. 1. More specifically, the steps of the method 300 may be performed by the processor 102 upon executing the executable code 106 and accessing input provided via the input device 110 and the information stored in the corpus 114. Outputs of the method 300 may be provided via the output device 112.

The method 300 begins with receiving an original input text that includes a term suitable for replacement (step 302). The step 302 is analogous to step 202 (FIG. 2) and is thus not described in greater detail here. The method 300 also includes comparing the definition of the term to be replaced with definitions of candidate replacement terms in the corpus 114 (step 304). The step 304 is similar to the step 204 and is thus not described in greater detail here. The steps 302 and 304 may be performed by, e.g., the processor 102.

The method 300 further comprises using the aforementioned definition comparisons to form a set of candidate replacement terms and to generate first scores for each of the candidate replacement terms (step 306). The processor performs this step and may, for instance, generate the first scores for the candidate replacement terms in the set by quantifying the similarity between definitions as described above with respect to step 204 (FIG. 2).

The method 300 may further include the processor 102 analyzing the grammar of each of multiple modified input texts produced by substituting each of the candidate replacement terms in the set into the original input text (step 308). Grammatical accuracy may be quantified as described above with respect to step 206 (FIG. 2). The step 308 also includes the processor 102 comparing the meanings of the modified input texts to the meaning of the original input text to assess the degree to which each of the modified input texts preserves the meaning of the original input text. The manner in which such comparisons may be performed is described above with regard to step 208 (FIG. 2). The description of step 208 above also describes quantification of similarity between meanings of different terms. The processor 102 may use the quantification of grammatical accuracy and similarity between meanings to produce a second score for each of the candidate replacement terms in the set (step 310). In some embodiments, the processor 102 may produce the second score for each candidate replacement term by averaging the quantifications for the grammatical accuracy and similarity of meaning for that particular candidate replacement term.

The method 300 still further comprises the processor 102 assessing the degree to which each of the candidate replacement terms in the set meets a plurality of criteria (step 312). The criteria may be the types of criteria described above with respect to step 212 (FIG. 2), or the criteria may be of different types. In addition, such criteria may be weighted or unweighted, as described above. Similarly, the degree to which each candidate replacement term complies with a particular criterion may be quantified as described above. Based on such quantifications of compliance with criteria, and additionally based on weights that may be applied to such criteria, the processor 102 may generate a third score for each of the candidate replacement terms in the set (step 314). In some embodiments, for example, weights for criteria may be multiplied by the corresponding quantifications of compliance with such criteria, and the resulting products may be summed to produce the third score.

Alternatively, in some embodiments, the step 312 may comprise assessing the popularity of a particular candidate replacement term within a target demographic. For example, in the social media context, the processor 102 may access the corpus 114 to determine the average number of social media posts per day including a particular candidate replacement term, the average number of hours that passes between the first time that a social media post mentioning the candidate replacement term is made to the last time that post has stopped being re-posted, and the number of times that a social media post containing the candidate replacement term has been re-posted by other users. Other social media metrics also may be used to assess the "resonance," or popularity, of a particular candidate replacement term. All such metrics may be determined using corpus 114 content pertaining to a target demographic, using content pertaining to multiple demographics, or using the entire corpus 114. The processor 102 may quantify such metrics and may use the quantified metrics to generate a third score for each of the candidate replacement terms (e.g., by averaging the metrics, by weighting each of the metrics and then summing them together).

The method 300 continues still further with the processor 102 applying weights to the first, second, and third scores for each of the candidate replacement terms in the set to calculate a final score for each of the candidate replacement terms (step 316). In some embodiments, no weights are applied to the first, second, and third scores. In at least some embodiments, final scores may be calculated as follows:

$$\text{Final score} = a*\text{First score} + b*\text{Second score} + c*\text{Third score},$$

where each of the first, second, and third scores may be determined using any of the techniques described above or using other suitable techniques, and where a, b, and c are weights (e.g., $a+b+c=1$ and $0<a, b, c<1$) provided by a user, the processor 102, or any other suitable entity. In some embodiments, the computer system 100 comprises a cognitive computer and, in such embodiments, the processor 102 may learn a user's weighting preferences over time and may automatically apply such preferences in subsequent calculations.

The method 300 also includes the processor 102 ranking the candidate replacement terms in the set based on the final scores calculated for the candidate replacement terms (step 318). The processor 102 may then display the rankings on a display (step 320). The method 300 may be modified as desired, including by adding, deleting, modifying, or rearranging one or more steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method, comprising:
receiving original input text that includes a term;
determining the term should be replaced based upon a target audience of the original input text;
determining multiple candidate replacement terms based upon the target audience;
comparing a definition of the term to definitions of the multiple candidate replacement terms to generate a set of candidate replacement terms;
substituting each of the candidate replacement terms in the set for the term in the original input text to produce a plurality of modified input texts;
determining a grammatical accuracy of each of the plurality of modified input texts;
comparing meanings of the plurality of modified input texts to a meaning of the original input text;
reducing the set of candidate replacement terms based on the grammatical accuracy of each of the plurality of modified input texts and the comparisons of the meanings;
determining a frequency of use for each of the candidate replacement terms among the target audience in the reduced set of candidate replacement terms;
ranking the reduced set of candidate replacement terms based on the frequency of use of each of the candidate replacement terms among the target audience; and
displaying the candidate replacement terms in the reduced set of candidate replacement terms according to the ranking on a display.

2. The method of claim 1, wherein the multiple candidate replacement terms are selected from a dynamically modifiable corpus.

3. The method of claim 2, further comprising updating the dynamically modifiable corpus using linguistic trends.

4. The method of claim 2, wherein the dynamically modifiable corpus includes social media content.

5. The method of claim 2, wherein the dynamically modifiable corpus is based on the target audience.

6. The method of claim 1, wherein all terms in the ranked, reduced set of candidate replacement terms are in a same language.

7. The method of claim 1, further comprising comparing at least one of the plurality of modified input texts to text in a corpus to identify a number of matches.

8. A computer program product for identifying linguistic replacements to improve textual message effectiveness, the computer program product comprising a computer-readable storage medium having program instructions embodied therewith, which when executed by a processor, cause the processor to:
receive original input text that includes a term;
determine the term should be replaced based upon a target audience of the original input text;
access a dynamically modifiable corpus of candidate replacement terms to collect a set of candidate replacement terms based on the target audience;
reduce the set of candidate replacement terms based on an analysis of definitional similarity between the term and each of the set of candidate replacement terms, of a grammatical accuracy of modified input texts generated by replacing the term with each of the candidate replacement terms in the set, and of a meaning of each of the modified input texts;
determine a frequency of use for each of the candidate replacement terms among the target audience in the reduced set of candidate replacement terms;
rank the reduced set of candidate replacement terms based on the frequency of use of each of the candidate replacement terms among the target audience; and
display the candidate replacement terms in the reduced set of candidate replacement terms according to the ranking on a display.

9. The computer program product of claim 8, wherein each candidate replacement term in the set of candidate replacement terms pertains to an audience targeted by the original input text.

10. The computer program product of claim 8, wherein the dynamically modifiable corpus includes social media content.

11. The computer program product of claim 8, wherein the analysis of the grammatical accuracy is based on grammar rules used by the target audience of the original input text.

12. The computer program product of claim 8, wherein the program instructions cause the processor to modify a portion of the original input text other than the term based on at least one of the candidate replacement terms in the set.

13. A system, comprising:
an input device configured to receive original input text that includes a term;
an output device configured to display images;
storage comprising executable code;
a network interface configured to access a dynamically changing corpus of information; and
a processor coupled to the input device, the output device, the storage, and the network interface,
wherein execution of the executable code causes the processor to:
determine the term should be replaced based upon a target audience of the original input text;
collect, from the corpus, a set of candidate replacement terms based on the target audience and comparisons of definitions of the candidate replacement terms and a definition of the term in the original input text;
generate a first score for each of the candidate replacement terms in the set based on the comparisons of definitions;
analyze a grammatical accuracy of modified input texts that replace the term with the candidate replacement terms in the set;
determine a meaning of each of the modified input texts;
generate a second score for each of the candidate replacement terms in the set based on the grammatical analyses and the meaning determinations;
assess a popularity of each of the modified input texts using the corpus;

generate a third score for each of the candidate replacement terms in the set based on the popularity assessments;
determine a final score for each of the candidate replacement terms in the set based on a weighted calculation using the first, second, and third scores of each such candidate replacement term;
rank the candidate replacement terms in the set based on the final scores; and
display the ranking on the output device.

14. The system of claim 13, wherein the first, second, and third scores are based on the target audience of the original input text.

15. The system of claim 13, wherein each of the first, second, and third scores are weighted.

16. The system of claim 13, wherein the system comprises a cognitive computer.

17. The system of claim 13, wherein the corpus includes linguistic trends that vary with time.

18. The system of claim 13, wherein the processor learns a user's weighting preferences for the weighted calculation and automatically applies the weighting preferences.

\* \* \* \* \*